United States Patent
Rondeau

[19]

[11] Patent Number: 5,850,433
[45] Date of Patent: *Dec. 15, 1998

[54] SYSTEM AND METHOD FOR PROVIDING AN ON-LINE DIRECTORY SERVICE

[75] Inventor: David Edward Rondeau, Olathe, Kans.

[73] Assignee: Sprint Communication Co. L.P., K.C., Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 642,009

[22] Filed: May 1, 1996

[51] Int. Cl.$^6$ .............................. H04M 1/64; H04M 3/42
[52] U.S. Cl. .............................. 379/201; 379/67; 379/88; 379/89; 379/201; 379/213; 379/216
[58] Field of Search ................................. 379/67, 88, 89, 379/201, 213, 216

[56] References Cited

U.S. PATENT DOCUMENTS

| | | | |
|---|---|---|---|
| 4,979,206 | 12/1990 | Padden et al. | 379/67 |
| 5,111,409 | 5/1992 | Gasper et al. | 395/152 |
| 5,179,587 | 1/1993 | Bock et al. | 379/95 |
| 5,228,029 | 7/1993 | Kotzin | 370/95.1 |
| 5,457,738 | 10/1995 | Sylvan | 379/96 |
| 5,483,586 | 1/1996 | Sussman | 379/201 |
| 5,572,643 | 11/1996 | Judson | 395/793 |
| 5,608,446 | 3/1997 | Carr et al. | 348/6 |

OTHER PUBLICATIONS

"IDT Announces Major Breathrough That Will Allow Worldwide PC to–Telephone Calls Over the Internet", *IDT World Wide Website Press Release,* Oct. 23, 1995, Hackensack, N.J.

Primary Examiner—Fan S. Tsang
Assistant Examiner—Allan Hoosain
Attorney, Agent, or Firm—Harley R. Ball; Jed W. Caven

[57] ABSTRACT

An on-line directory service includes a server associated with a database containing a plurality of directory listings including advertising information. A customer subscribing to the on-line directory service may selectively view directory listings from the database by initiating a search research at a personal computer linked with the server. The search request may specify a particular service or product, a particular geographical preference or other search parameters. The search request is then forwarded to the server which accesses the database and retrieves the responsive information for the customer. To place a telephone call to a service provider listed in response to the customer search request, the customer merely activates a telephone icon associated with the selected service or product provider. The server then obtains a telephone number associated with the selected provider from the database and automatically dials the telephone number. Once the telephone call is connected, the directory service establishes a voice connection extending from the customer's computer to a remote telephone device associated with the selected provider. The directory service also develops individual customer profiles for individual customers and stores these profiles in the database. The profiles, which include historical directory usage information, may be used to customize the menu screens and search results provided to the customer.

56 Claims, 2 Drawing Sheets

SYSTEM AND METHOD FOR PROVIDING AN ON-LINE DIRECTORY SERVICE

BACKGROUND OF THE INVENTION

This invention relates in general to commercial directory services and, more particularly, to a system and method for providing an on-line directory service.

Directories which provide consumers with advertising or other information about commercial entities have traditionally been provided in the form of a printed publication (e.g., yellow pages). These traditional business publications, which are usually limited to a specific geographical area, are typically subsidized by the commercial entities which agree to place advertisements therein. The advertisements are generally grouped together based on the nature of services provided. Accordingly, the commercial providers of a particular service are listed in alphabetical order within the listing for that service, and each of the service listings in the directory are arranged alphabetically. A directory index may also be provided to cross-reference the various services listed.

Although the traditional directory publications described above may be helpful to consumers in locating service providers and are inexpensive from the consumer's standpoint, these traditional publications also have several drawbacks. Consumers consult these publications when they have an immediate need for information about a particular service or product. The consumer will become frustrated if the publication is not current or does not contain a listing for the desired service or product. Likewise, the consumer will become frustrated if the desired listing cannot be located quickly. However, providing duplicate listings for services which are essentially synonymous with one another (e.g., vehicles and automobiles) would be prohibitively expensive for the publisher of the directory and would result in an oversized directory that would be cumbersome for consumers to use. Consequently, it is not uncommon for consumers to spend several minutes searching through the directory and the index before finally locating the desired category or listing.

More recently, on-line services have emerged which provide an alternative medium for communicating advertising and other information about service providers. The Internet provides an international forum for commercial entities to provide extensive information about their services and products to computer users. For example, a commercial entity may establish a "home page" on the Internet so that computer users can learn more about their services and products. Although home pages and other forms of on-line advertising may be readily accessible to sophisticated computer users, such listings are generally not arranged alphabetically nor grouped together under service headings. Consequently, it may be difficult, even for a sophisticated computer user, to directly compare the advertising information of competing service providers. Moreover, the computer user must either sign off or access a separate telephone line before placing a telephone call to one of the service providers located while on-line.

Although efforts are underway to provide voice communications over the Internet, existing methods are rather limited. Presently, a voice connection can be established between two computer terminals so long as both terminals are "on" and the user at the calling terminal knows the IP (Internet Protocol) address of the called terminal. However, this type of communication is not particularly efficient for consumers seeking information about a particular service or product since the consumer is not provided with any advertising information. This approach would also reduce the consumer's options because it would only provide access to those businesses which offer on-line customer service to the general public.

U.S. Pat. No. 5,483,586 to Sussman discloses an on-line telephone directory database system which contains the electronically stored equivalent of a local telephone book. In addition to local residential listings, the centralized database may contain listings for local businesses including a short description of the type of business, e.g., restaurant. Periodically, the central database downloads the latest general directory to the subscriber's terminal. The only subscriber specific information that is stored at the centralized database location is the subscriber's preferred download time (e.g., 3:00 a.m. every Tuesday). The subscriber may also develop and store locally a small, personalized directory for important or frequently called numbers. The development and maintenance of this local, personalized directory is at the discretion of the subscriber. The subscriber may use the periodically downloaded, general directory or the local, personalized directory to place telephone calls. However, these telephone calls must be placed when the subscriber's directory terminal is not on-line with the central database.

Those skilled in the art will recognize that the benefits of the Sussman database system are rather limited. A subscriber placing a telephone call can only access those listings which have already been stored in the subscriber's personalized directory or downloaded to the subscriber's directory terminal. Moreover, the number of listings which can be stored in the downloaded directory is necessarily limited by the memory available at the subscriber's terminal. Likewise, the amount of advertising information stored in the subscriber's downloaded directory is severely limited by the memory available at the subscriber's terminal. Accordingly, even if the on-line database disclosed in the Sussman patent contains a relatively comprehensive business directory, telephone calls to these businesses are placed off-line when access is limited to the downloaded directory. Furthermore, the information contained in the downloaded directory will not be as current as the on-line information.

Considering the many limitations of available directory services, there exists a need for an on-line directory service which effectively combines the advantages of a printed telephone directory with the advantages of on-line databases. Moreover, there is a need for an on-line directory service which provides extensive advertising information yet reduces the amount of time required to place a telephone call to one of the service providers listed in the on-line directory.

SUMMARY OF THE INVENTION

The present invention is directed to a system and method for providing an on-line, electronic directory service. The invention overcomes the problems and limitations set forth above by providing a server associated with a database containing a plurality of directory listings including advertising information. A customer subscribing to the on-line directory service may selectively view directory listings from the database by initiating a search request at a personal computer linked with the server. The customer initiates a search request by identifying a particular service or product. Other search criteria such as a geographical preference can also be specified. The search request is then forwarded to the server which accesses the database and retrieves the responsive information for the customer.

A telephone icon is displayed at the personal computer to facilitate a telephone call to one of the service providers listed in response to a customer search request. To place a call, the customer merely clicks on the telephone icon after selecting a specific service provider from the directory listings displayed at the customer's computer. Then, the server obtains a telephone number associated with the service provider from the database and automatically dials the telephone number. Thus, a customer can place an on-line telephone call to the desired service provider without knowledge of the telephone number of the service provider. The integrated voice and data connection between the personal computer and the server is linked with the voice connection between the server and the remote telephone device at the service provider location to establish a single voice connection extending from the personal computer to the remote telephone location. In a further embodiment, an integrated voice and data connection extending from the personal computer to the remote telephone location could be provided by establishing a voice and data connection between the server and a computer at the remote telephone location. Consequently, when the remote telephone device is a computer, voice and data may be exchanged simultaneously over the entire connection.

The present invention also involves developing unique customer profiles for individual customers. In addition to a customer identifier, an individual customer profile will primarily include historical directory usage information such as the types of searches the customer has requested in the past. The customer profile information will allow default prompts and responses to be established for individual customers. Similarly, the present invention may modify a customer's search request based on the customer's previous requests. For example, a customer who usually requests directory listings for commercial entities in a specific metropolitan area would be provided such listings first in response to a future search request that does not include a specific geographical restriction.

Accordingly, it is an object of the present invention to provide a system that includes a server associated with a database containing directory listings for a plurality of service providers, wherein the directory listings include advertising information that may be selectively transmitted to a personal computer in response to a search request initiated at the personal computer.

Another object of the present invention is to provide a system and method for providing an on-line directory service wherein a server automatically initiates the placement of a telephone call to a remote telephone device in response to a call request originating at a personal computer. A related object of the present invention is to provide an on-line directory service capable of establishing a voice connection between a personal computer and a remote telephone device associated with a service provider. A further related object of the present invention is to provide an on-line directory service capable of establishing a voice and data connection between a personal computer and a remote telephone device associated with a service provider.

Yet another object of the present invention is to provide a method for utilizing an on-line directory service to identify one or more service providers satisfying a specific search request and to obtain extensive advertising information associated with the service providers.

A further object of the present invention is to provide a system and method for developing individual customer profiles for the customers of a computerized directory service, wherein the profiles include demographic and historical use information for the individual customer. A related object of the present invention is to provide a system and method for supplementing a search request from a customer based on demographic and historical information in the individual customer profile for that customer.

Still another object of the present invention is to provide a system and method for using a computerized directory service to locate a service provider and to place a telephone call to that service provider without requiring knowledge of the service provider's telephone number.

It is still another object of the present invention to provide a system and method for targeting prospective consumers of a specific service or product based on customer profile information relating to demographic and historical use information of customers of a directory service.

These and other objects of the present invention will become readily apparent upon further review of the specification and drawings. To accomplish the objects of the present invention, a system is provided comprising a terminal server adapted to communicate with a personal computer by establishing a data link therebetween capable of carrying information and voice over a first communications line, a database server coupled with the terminal server and adapted to access data residing in an associated database, the database server being further adapted to transmit data from the database to the personal computer in response to a database search request, a telephony server coupled with the database server and adapted to communicate with a remote telephone device by establishing a voice link over a second communications line upon receiving the call request from the personal computer and means for integrating the data link and the voice link into a voice connection between the personal computer and the remote telephone device.

In another aspect, the objects of the present invention are accomplished by a method comprising providing a data link between a computer and a server associated with a database, receiving a search request from the computer, communicating information from the database over the data link for display at the computer, receiving a call request from the computer, dialing a telephone number in response to the call request and establishing a voice connection between the computer and a remote telephone device.

Similarly, the objects of the present invention are accomplished by a method comprising providing a server associated with a directory database containing a plurality of directory listings including advertising information, creating a customer profile for a customer and storing the profile in a customer profile database associated with the server, receiving a first directory search request from the customer, communicating one or more directory listings for display at the customer computer, updating the customer profile to include information relating to the first directory search request, receiving a second directory search request from the customer, supplementing the second directory search request with the updated customer profile and communicating one or more directory listings for display at the customer computer.

BRIEF DESCRIPTION OF THE DRAWINGS

In the accompanying drawing which forms a part of the specification and is to be read in conjunction therewith, and in which reference numerals are used to indicate like parts in the various views.

DESCRIPTION OF THE PREFERRED EMBODIMENT(S)

Figure 1:
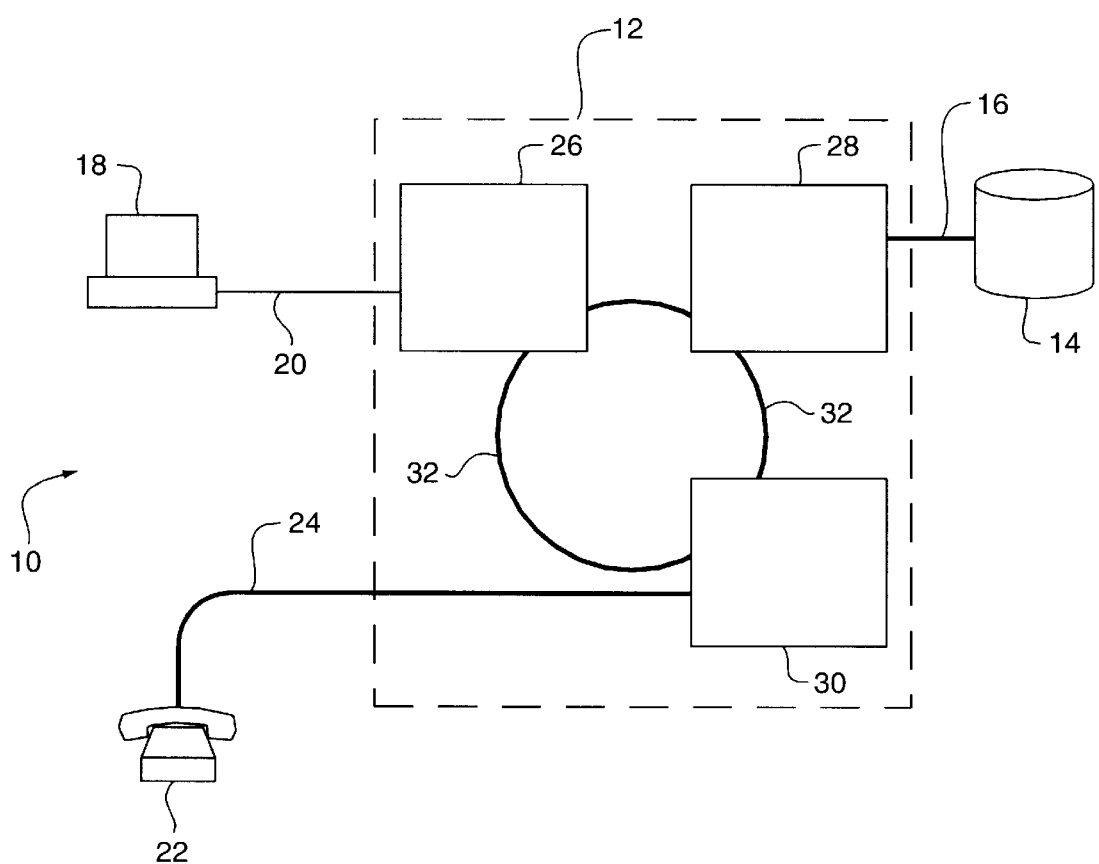
FIG. 1 is a schematic of a system for providing an on-line directory service in accordance with a preferred embodiment of the present invention.

Referring to the drawings in greater detail, and initially to FIG. 1, the on-line directory system of the present invention is designated generally by reference numeral 10. System 10 comprises a server center 12 and an associated database 14 connected to server center 12 by a data link 16. Server center 12 communicates with a personal computer 18 over a data link 20, and server center 12 communicates with a remote telephone device 22 over a voice link 24.

In a preferred embodiment, server center 12 comprises a terminal server 26, a database server 28 and a telephony server 30 interconnected with one another over a local area network (LAN) 32. Accordingly, computer 18 is coupled with terminal server 26, database 14 is coupled with database server 28 and telephone 22 is coupled with telephony server 30.

Computer 18 is preferably a multimedia personal computer equipped with a sound card, speakers, a microphone and a modem. The Gateway 2000 model P590 is a commercially available personal computer that has been found to work well with the present invention. Computer 18 includes a sound card such as Creative Labs' PhoneBlaster model and an internal modem such as the 28.8 kilobit per second (kb/s) internal modem manufactured by U.S. Robotics. Moreover, it is presently preferred to employ Microsoft's Windows 95 operating system in conjunction with the SpeakFreely (shareware) telephone client application and the Netscape Navigator 2.0 browser client application.

Terminal server 26 answers incoming data calls from computer 18 over link 20. In the disclosed embodiment, terminal server 26 is the Robocop server marketed by CISCO/U.S. Robotics, and link 20 is the normal standard grade telephone line associated with Plain Old Telephone Service (POTS). Data link 20 is thus capable of carrying both voice and data thereover. The terminal server 26 obtains the highest available modem speed, which is 28.8 kb/s for a V.34 connection. Terminal server 26 also controls the communications protocol, which is preferably the Point to Point Protocol (PPP). This protocol is commonly used by Internet service providers and allows for the extension of the Internet Protocol (IP) to "off-net" devices. On the back side of terminal server 26, IP traffic is carried over the physical LAN 32.

LAN 32 connects servers 26, 28 and 30 with one another and brings their combined functionality together. In a preferred embodiment, Transmission Control Protocol (TCP) packets (for data) and User Datagram Protocol (UDP) packets (for voice) are carried on the IP stack over Ethernet. It has been found that an Ethernet 10BaseT network may be used for LAN 32.

Database server 28 delivers information to the computer user's browser software and interprets search requests or queries for database retrieval. The queries and responses may be customized based on the customer profile information stored in the database 14. When a telephone call is requested, database server 26 instructs computer 18 to launch the telephone client -application and provides telephony server 30 with the telephone number to dial for the call destination 22.

In the disclosed embodiment, server 28 utilizes the SUN Microsystems Sparc 20 central processing unit (CPU) and the SUN Solaris 5.3 operating system. Additionally, server 28 utilizes the Oracle 7 RDBMS database management system and includes an NCSA (National Center for Supercomputer Applicants) Web server, which provides the hypertext transport protocol (HTTP) connection to the browser application at computer 18. The interface between the Oracle database and the common gateway interface (CGI) is supported by Oracle WOW and by PL/SQL (Procedural Language/Structured Query Language) scripts, which are used to access the relational database. An HTML (hypertext markup language) interface permits the customer to select various search criteria, and WOW is invoked to query database 14 and return valid HTML results for display at computer 18.

Database 14 is implemented in an Oracle DBMS as tables containing a plurality of directory listings including advertising information. The database 14 is populated with information relating to businesses and is accessed through the WOW program. Individual customer profiles may also be stored at database 14, or the profiles may be stored at another database (not shown) associated with server 28. Those skilled in the art will appreciate that storing information at multiple databases coupled with server 28 is within the scope of the present invention. In a preferred embodiment, relational data tables are housed in database 14 to provide the desired structure and searchability of the on-line directory service. Oracle 7 relational tables and a UNIX file system have been used in connection with database 14 to achieve the functionality of the present invention.

Telephony server 30 provides an interface to the Public Switched Telephone Network (PSTN) and provides for transcoding between low-bit rate encoded voice signals and standard 64 kb/s pulse coded modulation (PCM) signals. Upon establishing an on-line telephone connection, voice messages may be conveyed back and forth between computer 18 and telephone 22. Specifically, UDP packets from the telephone client application at computer 18 are received at server 30, and the embedded low-bit rate encoded voice signals are transcoded to 64 kb/s PCM by code. The transcoded PCM signals are then transported to a destination 22 via a 64 kb/s channel 24 assigned to that destination by the PSTN. A voice message is conveyed from telephone 22 to computer 18 by transmitting PCM signals from the PSTN connected telephone 22 to server 30 over channel 24. Server 30 converts the PCM signals to low-bit rate encoded voice signals, which are forwarded to computer 18. It has been found that GSM (Global System for Mobil Communications) encoding is an acceptable type of low-bit rate encoding for use with the present invention.

In the disclosed embodiment, server 30 comprises a Gateway 2000, model P590 CPU utilizing the Solaris 5.3 operating system for an x86 computer. The electrical interface to the PSTN is preferably a Dialogic T1 Scan Card using Dialogic Solaris drivers to provide 24 PSTN lines. The presently preferred transcoding software, which is a modified form of the SpeakFreely program, is described below in greater detail in connection with the telephony interface. However, it is believed that a digital signal processor (DSP) chip can be utilized for transcoding so as to provide superior performance over the transcoding software that is currently available.

Outbound trunk 24 is the interface between server 30 and the PSTN. In a preferred embodiment, trunk 24 uses D4 framing, E & M supervisory signalling (including wink start signalling) and DTMF (Dual Tone Multiple Frequency) address signalling.

The remote telephone device 22 can be any telephone, key system or PBX (Private Branch Exchange) voice line with a discrete telephone number. Similarly, device 22 might be a computer that can be accessed by dialing a discrete telephone number. If device 22 is a computer, the voice and data connection established by system 12 permits computer users at computers 18 and 22 to communicate audio messages to one another over links 20 and 22 that are broadcast at computers 18 and/or 22 and, at the same time, to communicate data messages to one another over links 20 and 22 that are displayed at computers 18 and/or 22.

The telephony interface for the present invention comprises five custom programs: "ht_call", "dial", "udprec", "chan" and "udpsend". Since "ht_call" is a CGI script, it runs on server 28 and invokes action on telephony server 30. When a call is requested at computer 18, "ht_call" obtains the selected phone number and the IP address of host computer 18. The "ht_call" program, which is written in the "C" programming language, uses the UNIX remote shell command "rsh" to start the dial command on server 30.

The "dial" command provides the main interface between system 12 and the PSTN. Once "dial" has the IP address of the host, the IP address of the port to communicate with, the PSTN channel to use and the telephone number to dial, it spawns four children in two sets of two, with pipes connecting the children in each set. These children comprise a "udprec/chan -T" pair and a "chan -L/udpsend" pair.

The "udprec" program listens at the specified UDP port and captures the SpeakFreely encoded audio packets coming down the wire. Then, "udprec" decapsulates the packets, uncompresses the GSM encoded audio and transcodes the encoded audio into PCM. The "udprec" program incorporates GSM decoding routines from the GSM program "untoast", which is part of Netfone, the UNIX counterpart to SpeakFreely.

The "chan" command handles the actual dialing of the phone number and, with the -T flag, runs in "talk" mode to transfer incoming PCM encoded audio onto a phone channel. With the -L flag, "chan" runs in "listen" mode and outputs PCM encoded audio taken off of a phone channel.

The "udpsend" program, which is the counterpart to "udprec", reads incoming PCM encoded audio, compresses it into GSM format, encapsulates it into SpeakFreely compatible packets and sends it with UDP to the specified host. The "udpsend" program incorporates GSM compression routines from the GSM program "toast".

Figure 2:
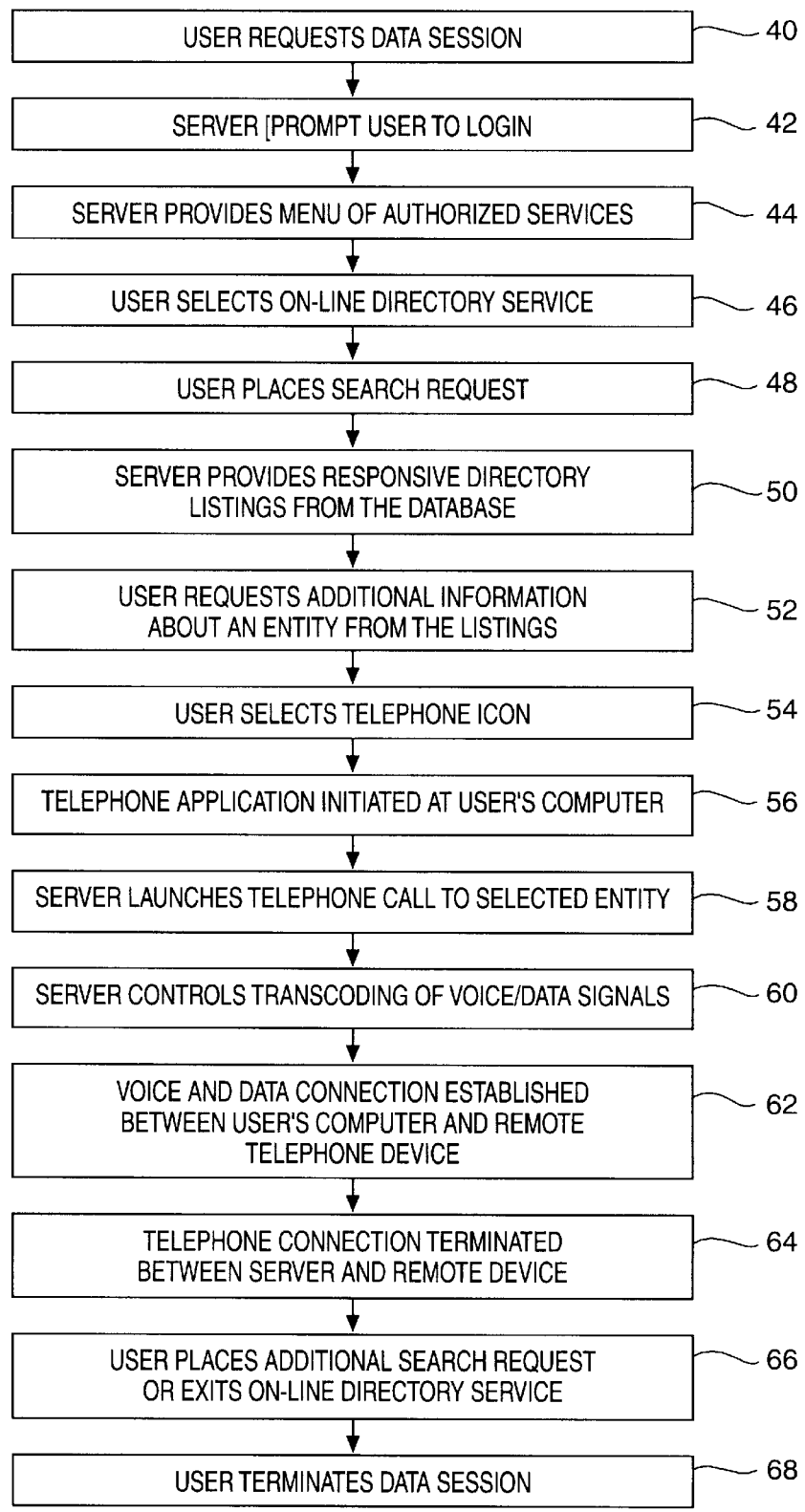
FIG. 2 is a flow diagram illustrating a method for utilizing an on-line directory service in accordance with a preferred embodiment of the present invention.

With reference to FIG. 2, a flow diagram illustrates an exemplary method for operating the on-line information service of the present invention. Initially, at block 40, a computer user who subscribes to the on-line service requests a data session between the user's personal computer 18 and terminal server 26. A session is requested by activating client software at computer 18 which instructs a modem associated with computer 18 to dial terminal server 26.

Next, at block 42, the user is prompted by database server 28 to login. After the user's identity is confirmed by matching the login name with the corresponding password, the user is presented with a menu of authorized services at block 44. The content and structure of the menu is based on information contained in the user's individual customer profile stored in database 14.

When the user selects the on-line directory service icon from the menu at block 46, a directory is presented to the user. The user may navigate the directory at block 48 by using a hierarchical menu and/or by inputting search criteria. Further, the interface may be customized for the user based on unique customer profile information contained in database 14. In response to the user's menu selection or other search request, the service forwards directory listings from database 14 to computer 18 for display to the user at block 50. At block 52, the user may obtain additional information about a given entity from the directory listings by selecting an icon or hypertext associated with the listing for that entity. Hypertext, which is usually displayed as underlined and highlighted text, permits a user to move directly from one screen to another.

The user selects a telephone icon at block 54 to place a telephone call to the entity associated with the selected listing. Then, database server 28 instructs computer 18 to initiate a telephone application at block 56. The telephone application converts audio signals received through the computer's microphone into outgoing low-bit rate data signals and converts incoming low-bit rate data signals to audio signals through the computer's speakers.

At block 58, database server instructs telephony server 30 to launch a telephone call to the selected entity. Server 30 controls both supervisory (on-hook and off-hook) signalling and address (dialed telephone number) signalling. Additionally, at block 60, server 30 controls converting or transcoding between low-bit rate encoded voice signals and standard 64 kb/s PCM signals. The called party at telephone 22 answers the telephone call, which permits voice (or integrated voice and data) communication between computer 18 and telephone 22 at block 62.

When the telephone connection between server 30 and telephone 22 is terminated at block 64, the user at computer 18 either places another search request or exits the on-line directory service and returns to the menu of authorized services. If no further services are desired, the user terminates the data session at block 68.

The on-line directory service of the present invention may be used for a variety of applications which were not available in the prior art. For example, a computer user can locate a service provider for a desired product and place a telephone call to that service provider within the on-line directory environment. Moreover, the user can simultaneously communicate both voice and data messages with another computer user. Further, a computer user can view on-line advertisements, which may involve animation or other information that is too voluminous to be conveniently downloaded. The directory service may also include real-time advertisements, such as for the sale of a used automobile, which would not be current if downloaded to an "off-line" computer. In the on-line environment, the computer user is always viewing the most current information. As an example, directory listings for a theater may include information regarding show times, ticket availability and seat location. The interactive nature of the present invention would permit a computer user viewing a theater's directory listing to purchase tickets to a particular show by either placing an on-line telephone call to the theater's box office or by entering credit card information at the user's computer. Additionally, a record of a user's on-line activity is maintained in an individual customer profile so that responses to future search requests can be tailored to the particular user. Likewise, historical use information for a plurality of customers may be used to identify those users who may be interested in a particular product or service. Thus, the on-line service provider could direct advertising to particular users without revealing the identity of those users to the company sponsoring the ad. Such an arrangement is beneficial to all parties because the selected users will receive relevant information without being subjected to future marketing by the sponsor, the sponsoring company is able to direct its marketing efforts to interested individuals and the on-line service provider receives a fee from the sponsor for coordinating distribution of the advertisement. These and other features of the present invention are not found in the prior art.

One specific application for using the on-line directory is to make dinner reservations at a local restaurant. If the user is interested in either Chinese or Italian food, the user queries the database for local restaurants featuring Chinese and/or Italian menu items. The user may further restrict the search to a downtown location if desired. The on-line directory returns a number of candidate restaurants including advertisements for the listed establishments. The user browses through the listed restaurants, many of which provide their menus as well as their hours. The user chooses an Italian restaurant and clicks on the telephone icon, thereby launching a telephone call to the selected restaurant. If that restaurant is booked for the evening, the user closes the voice connection and clicks on the telephone icon for a second restaurant. This process can be repeated until reservations are secured.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A system for providing an on-line electronic directory service to a user at a personal computer and for automatically placing a telephone call to a remote telephone device in response to a call request originating at the personal computer, said personal computer running a web browser application configured to receive web pages from a remote server, to present said web pages to said user and to navigate among web pages by sending navigational commands to said remote server, said system comprising:

a terminal server interconnected to said personal computer over a first communications line and communicating with the web browser via a data link over said first communications line;

a database server coupled with said terminal server and providing access to data residing in an associated database, said database containing directory listings, at least some of said directory listings including advertising information, said database server receiving a first directory search request from said personal computer and responsively searching said database for a directory listing meeting said first directory search request, and said database server providing to said web browser a web page bearing a directory listing, said directory listing corresponding to a telephone number of said remote telephone device;

a telephony server coupled with said database server and communicating with the remote telephone device by establishing a voice link over a second communications line upon receiving the call request, said telephony server further integrating the data link and the voice link by a process comprising transcoding between low bit rate encoded voice signals and pulse code modulation signals, so that a voice connection is established between the personal computer and the remote telephone device while said terminal server is interconnected to said personal computer, whereby, through said web browser, said user may search said database for a desired directory listing, said user may send a call request indicating a desire to establish said voice connection with said remote telephone device, and, in response to said call request, said telephony server may establish said voice connection.

2. The system of claim 1, wherein the second communications line is a telephone line in a switched telephone network.

3. The system of claim 2, wherein the first communications line is a telephone line in a switched telephone network.

4. The system of claim 2, wherein the first communications line is a dedicated line.

5. The system of claim 1, wherein the second communications line is a dedicated line.

6. The system of claim 1, wherein a telephone icon associated with the directory service is presented at the personal computer to facilitate initiation of a call request.

7. The system of claim 1, wherein said terminal server, said database server and said telephony server are discrete devices.

8. The system of claim 7, further comprising a local area network interconnecting said terminal server, said database server and said telephony server.

9. The system of claim 1, wherein said terminal server, said database server and said telephony server are components of a single server.

10. The system of claim 1, wherein said advertising information is associated with commercial telephone subscribers.

11. The system of claim 10, wherein the database associated with said database server contains real-time advertisements.

12. The system of claim 10, wherein the database associated with said database server contains animated advertisements.

13. The system of claim 1, wherein the database associated with said database server contains customer profile information relating to the user.

14. The system of claim 1, wherein the remote telephone device comprises a remote personal computer equipped with a modem.

15. The system of claim 1, wherein said telephony server is further adapted to integrate the data link and the voice link so that a voice and data connection is established between the personal computer and the remote telephone device.

16. A system as claimed in claim 1, wherein said web browser communicates via hypertext transfer protocol and said web pages are coded in hypertext markup language.

17. A system as claimed in claim 1, wherein said data link is a point-to-point data link carrying TCP/IP packets.

18. A system as claimed in claim 1, wherein:

said first directory search request includes a first search restriction;

said database server stores an indication of said first search restriction;

said database server receives a second directory search request from said personal computer, said second directory search request not including said first search restriction;

said database server automatically modifies said second directory search request to establish a modified second directory search request including said first search restriction; and said database server responsively searches said database for a second directory listing meeting said modified second directory search request and provides to said web browser a web page bearing said second directory listing.

19. A system as claimed in claim 18, wherein said first search restriction is a geographic restriction.

20. A method for providing access to information in an on-line electronic directory service database to a user at a computer and for automatically placing a telephone call to a remote telephone device in response to a call request originating at the computer, said computer running a web browser application configured to receive web pages from a remote server, to present said web pages to said user and to navigate among web pages by sending navigational commands to said remote server, said method comprising:

establishing a data link between the computer and a server associated with said directory service database;

receiving a first search request from the computer via said data link;

responsive to the first search request, searching said directory service database for a directory listing meeting said first search request, and communicating information from the directory service database over the data link for display at the computer, said information comprising a web page bearing a directory listing, said directory listing corresponding to a telephone number associated with said remote telephone device;

receiving a call request from the computer, indicating a request to establish a voice connection between said computer and said remote telephone device;

dialing said telephone number in response to the call request, to establish a voice link between the server and said remote telephone device associated with the dialed telephone number; and while said terminal server is interconnected to said computer, establishing a voice connection between the computer and the remote telephone device.

21. The method of claim 20, wherein the data link between the computer and the server is a dial-up link.

22. The method of claim 20, wherein the data link between the computer and the server is a dedicated link.

23. The method of claim 20, wherein the server comprises a terminal server, a database server and a telephony server.

24. The method of claim 23, further comprising interconnecting the terminal server, the database server and the telephony server over a local area network.

25. The method of claim 20, further comprising communicating instructions to the computer in response to the call request to convert outgoing audio messages to low bit rate data and to convert incoming low bit rate data to audio messages.

26. The method of claim 20, wherein establishing said voice connection comprises integrating said data link and said voice link.

27. The method of claim 26, wherein establishing said voice connection further comprises transcoding between data signals and voice signals at the server.

28. The method of claim 20, wherein the database associated with the server contains advertising information identifying a plurality of telephone subscribers and also contains the telephone numbers associated with the telephone subscribers.

29. The method of claim 28, further comprising displaying at the computer advertising information identifying one or more telephone subscribers.

30. The method of claim 29, wherein the advertising information displayed at the computer is a real-time advertisement.

31. The method of claim 29, wherein the advertising information displayed at the computer is an animated advertisement.

32. The method of claim 29, further comprising selecting a specific telephone subscriber from the one or more telephone subscribers identified.

33. The method of claim 32, further comprising selecting a telephone icon displayed at the computer to request a call to the selected telephone subscriber.

34. The method of claim 33, wherein said dialing step is performed automatically at the server using the telephone number from the database associated with the selected telephone subscriber.

35. The method of claim 20, wherein the remote telephone device comprises a remote personal computer equipped with a modem.

36. The method of claim 20, wherein said establishing step comprises establishing a voice and data connection between the computer and the remote telephone device.

37. The method of claim 36, wherein said establishing step is accomplished by forming a path for both voice and data communication from the computer to the server over the data link and from the server to the telephone device over the voice link.

38. A method as claimed in claim 20, wherein said data link is a point-to-point data link carrying TCP/IP packets.

39. A method as claimed in claim 20, wherein said web browser communicates via hypertext markup language and said web pages are coded in hypertext markup language.

40. A method as claimed in claim 20, wherein said first search request includes a first search restriction, said method further comprising, in combination:

storing an indication of said first search restriction;

receiving a second search request from said computer via said data link, said second search request not including said first search restriction;

automatically modifying said second search request to establish a modified second search request including said first search restriction; and responsive to the modified second search request, searching said directory service database for a directory listing meeting said modified second search request, and communicating information from the directory service database over the data link for display at the computer.

41. A method as claimed in claim 40, wherein said search restriction is a geographic restriction.

42. A method for providing a customized, on-line electronic directory service to a customer at a customer computer, said customer computer running a web browser application configured to receive web pages from a web server to present said web pages to said customer and to navigate among web pages by sending navigational commands to said web server, said method comprising:

providing a web server associated with a directory database containing a plurality of directory listings including advertising information;

creating a customer profile for the customer and storing the profile in a customer profile database associated with the web server;

receiving a first directory search request from the customer;

communicating one or more web pages bearing one or more directory listings for display at the customer computer in response to the first directory search request;

updating the customer profile to include information relating to the first directory search request;

receiving a second directory search request from the customer;

supplementing the second directory search request with the updated customer profile; and communicating one or more web pages bearing one or more directory listings for display at the customer computer in response to the second directory search request as supplemented.

43. The method of claim 42, further comprising obtaining demographic information relating to the customer and storing the demographic information in the customer profile.

44. The method of claim 42, further comprising receiving a call request from the customer in response to the directory listings communicated to the customer from the directory database.

45. The method of claim 44, further comprising placing a telephone call to a remote telephone device in response to receiving the call request from the customer.

46. The method of claim 45, wherein the remote telephone device comprises a remote personal computer equipped with a modem.

47. A system for providing an on-line electronic directory service to a user at a personal computer and for automatically placing a telephone call to a remote telephone device in response to a call request originating at the personal computer, said personal computer including a display and running a web browser application adapted to provide a user interface and to communicate with a remote device via hypertext transfer protocol, said system comprising, in combination:

a terminal server communicating via hypertext transfer protocol with said personal computer through a data link over a first communications channel;

a database server coupled with said terminal server and with an associated database, said database server receiving a directory search request provided by said personal computer and responsively searching said associated database and delivering a hypertext markup language (HTML) coded directory listing via said first communications link to said browser application for presentation to said user by said personal computer; and a telephony server coupled with said database server and adapted to communicate with the remote telephone device by establishing a voice link over a second communications channel upon receiving the call request, said telephony server being further adapted to integrate the data link and the voice link so that a voice connection is established between the personal computer and the remote telephone device.

48. A system as claimed in claim 47 further comprising a customer profile database accessible to said database server and containing customer profile data defining a first search restriction, wherein said search request does not include said first restriction, and wherein, before searching said associated database, said database server automatically modifies said search request to include said first restriction.

49. A system as claimed in claim 48, wherein said first restriction is a geographic restriction.

50. A system for providing an interactive, real-time telephone directory and advertisement service to a user at a personal computer and for establishing a voice connection between said personal computer and a selected remote telephone station, said personal computer executing a web browser application adapted to (i) receive web pages from a remote server, (ii) present said web pages to said user and (iii) navigate among web pages by sending navigational commands to said remote server, said system comprising, in combination:

a web server coupled to a database and to a telephone interface, said web server communicating with said personal computer via a data link;

said web server providing to said personal computer, via said data link, web pages including telephone directory listings and advertisements;

said web server receiving a directory search request from said personal computer, via said data link, and said web server responsively searching said database and delivering to said personal computer, via said data link, a web page bearing a directory listing and/or advertisement responsive to said search request, said directory listing and/or advertisement defining a telephone number corresponding to a remote telephone station;

said web server further receiving a call request from said personal computer, said call request defining a request to establish a voice connection between said personal computer and said remote telephone station; and responsive to said call request, said telephone interface establishing a voice link with said remote telephone station and integrating said data link and said voice link to establish said voice connection, whereby, through said web browser application, said user may send said directory search request to said web server, said personal computer may receive and present to said user said web page bearing said directory listing and/or advertisement, and said user may send said call request to said web server, indicating a desire to communicate by voice with the telephone station corresponding to said directory listing and/or advertisement, and whereby and said telephone interface may responsively establish said voice connection while said personal computer is connected to said web server.

51. A system as claimed in claim 50, wherein, before said web server searches said database, said web server automatically modifies said directory search request to include a search restriction defined by at least one previous search request.

52. A system as claimed in claim 51, wherein said search restriction is a geographic restriction.

53. A method of providing a customized, on-line electronic directory service to a customer at a customer computer, said customer computer running a web browser application configured to receive web pages from a web server, to present said web pages to said customer and to navigate among web pages by sending navigational commands to said web servers said method comprising:

providing a web server associated with a directory database containing a plurality of directory listings including advertising information;

creating a customer profile for the customer and storing the profile in a customer profile database associated with the server;

receiving a first directory search request from the customer, said first directory search request including a first search restriction;

communicating one or more web pages bearing one or more directory listings for display at the customer computer in response to the first directory search request;

updating the customer profile to include said first search restriction;

receiving a second directory search request from the customer, said second directory search request not including said first search restriction;

automatically supplementing the second directory search request with the updated customer profile and thereby establishing a modified second directory search request including said first restriction; and communicating one or more web pages bearing one or more directory listings for display at the customer computer in response to the modified second directory search request.

54. A method as claimed in claim 53, further comprising receiving a call request from the customer in response to the directory listings communicated to the customer from the directory database.

55. A method as claimed in claim 54, further comprising placing a call to a remote telephone device in response to receiving the call request from the customer.

56. A method as claimed in claim 55, wherein the remote telephone device comprises a personal computer equipped with a modem.

* * * * *